Feb. 18, 1930.  J. W. BRYCE  1,747,617
SCALE
Filed March 26, 1925   2 Sheets-Sheet 1

Inventor
James W. Bryce
By his Attorneys
Cooper, Kerr & Dunham

Feb. 18, 1930.    J. W. BRYCE    1,747,617
SCALE
Filed March 26, 1925    2 Sheets-Sheet 2
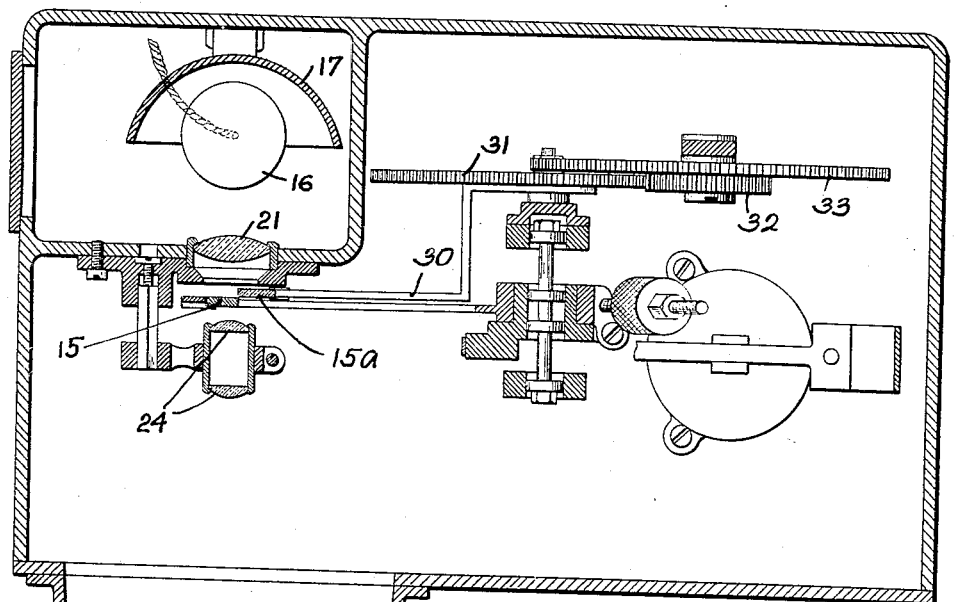
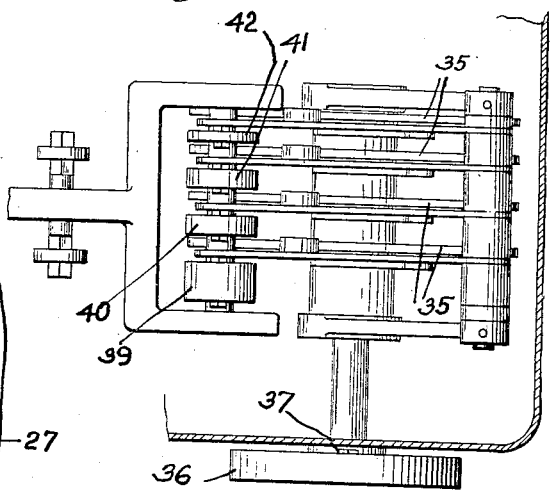
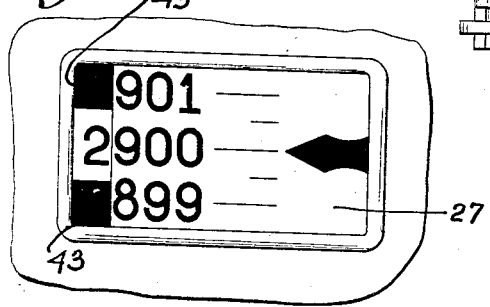

Patented Feb. 18, 1930

1,747,617

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

SCALE

Application filed March 26, 1925. Serial No. 18,347.

This invention relates to improvements in weighing scales and more particularly is directed to improvements in that form of scale in which the weight reading is optically projected upon a reading screen.

In previous scales of this class of which Schaper Patent No. 1,402,970 may be taken as an example, provision was made for optically projecting the weight which is automatically counterbalanced. A transparent chart or scale was displaced variably by the load offsetting mechanism and an intense light passed through this chart and the graduations and weights projected upon a screen displayed the amount of the load.

With scales of this sort weighings are frequently made in which the capacity of the automatic counterbalance is exceeded. No means has heretofore been provided for indicating optically such additional loads which are usually offset by capacity weights.

The present invention is directed to the provision of a novel combination of devices which will permit the load offset by the capacity weights to be optically projected alongside the other automatically counterbalanced displayed weight.

According to the present invention a supplementary chart is employed alongside the usual chart and the parts are so arranged that the beam of light will project weight values and graduations from both charts concurrently upon the screen. Provision is made for adjusting the supplementary chart by the capacity weight applying devices, which devices also are arranged to apply factored combinations of capacity weights to a moving part of the scale.

In the drawings,

Fig. 2 is a sectional view taken substantially on line 2—2 of Fig. 1.

Fig. 3 is a detail plan view of the weight mechanism.

Fig. 4 is a view of the complete weight indication as shown on the screen.

Figure 1:
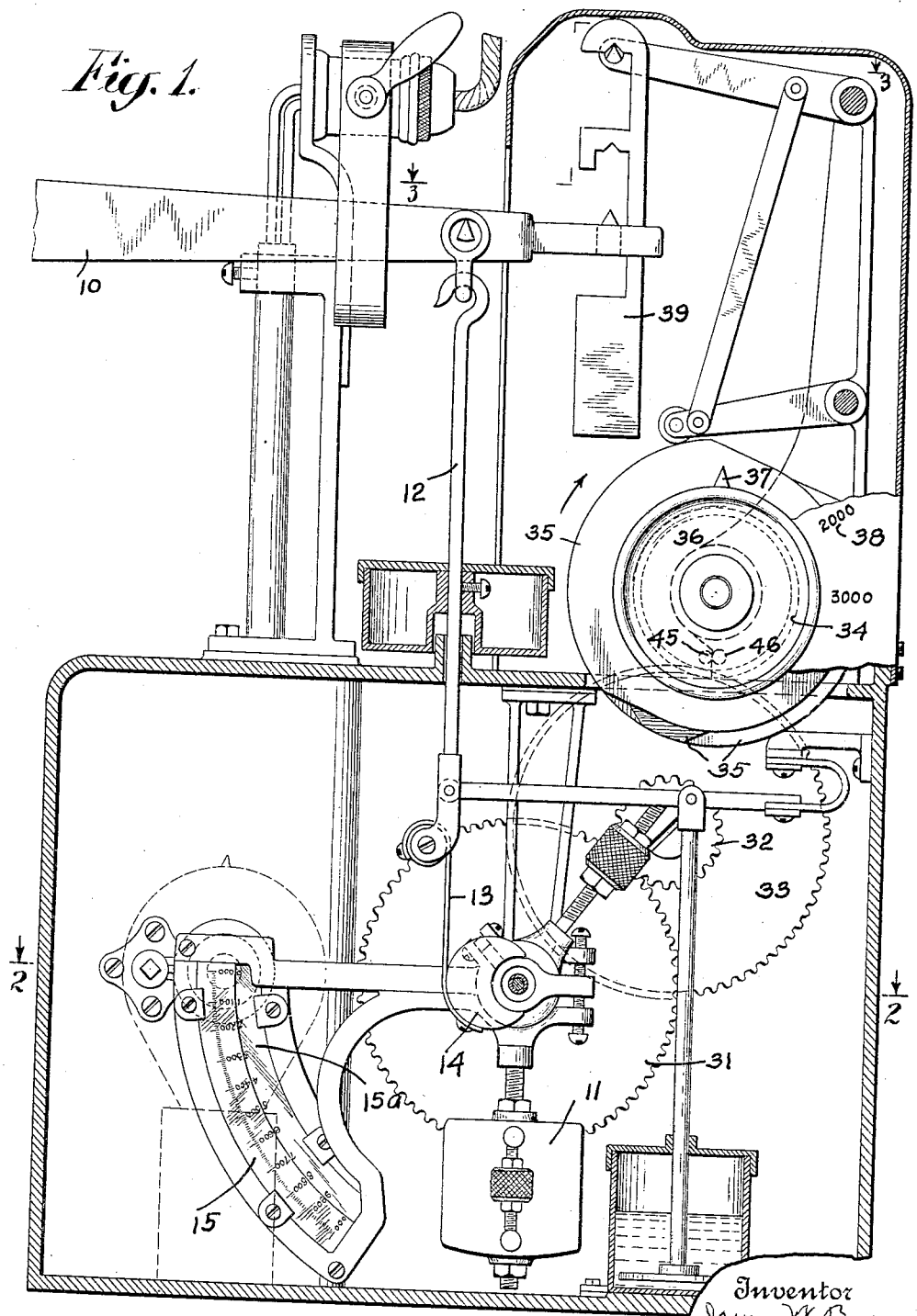
Fig. 1 is a front elevational view of the scale.

In more detail in the drawings, 10 is a scale beam, 11 the automatic load counterbalancing mechanism connected thereto by link 12 and strap 13 cooperating with the cam 14. 15 is the transparent chart or graduated scale which is displaced in accordance with the displacement of the counterbalancing mechanism 11. 16 is the lamp and 17 the reflector. From the reflector light is projected through the condensing lens 21, through transparent chart member 15, through lenses 24 onto screen 27. 28 is the usual pointer.

In addition to providing transparent chart 15 I provide in the present application a supplementary transparent chart $15^a$. This chart is spaced closely to chart 15 and has its graduations and weight indicating numerals on the face adjacent the face of chart 15 which carries the numerals. It will be understood that chart $15^a$ is graduated to correspond with the loads offset by the capacity weights which in the present embodiment are taken as one to nine thousand pounds respectively. Chart $15^a$ is carried upon an arm 30 which is fast to a gear 31. This gear 31 in turn is enmeshed with a gear 32 which has secured to it another gear 33. Gear 33 meshes with a gear 34 which is fast upon a shaft to which are fixed the various factor cams 35 of the capacity weight applying mechanism. In order to apply the capacity weights to the beam 10 I provide setting knob 36 preferably having an indicating pointer 37 cooperating with an indicating dial or chart 38. By rotating knob 36 in a clockwise direction various factored combinations of capacity weights 39, 40, 41 and 42 may be applied to the scale beam. These capacity weights 39, 40, 41 and 42 are respectively made with relative weights of 4, 2, 2 and 1. Obviously if weight 42 is applied to the beam one unit, say, one thousand pounds will be offset. By applying 42 and 41 a total of three thousand pounds will be offset and by applying other combinations which will be selected by the factoring cams 35 of combinations of from one to nine thousand pounds may be applied to the beam. Thus it will be seen that with only four weights it is possible to secure load capacities of one to nine in steps of one.

It will be understood that the displacement of the factor cams 35 causes a corresponding displacement of the supplementary indicator 15$^a$ with the result that the combined indication from chart 15 and chart 15$^a$ will be projected upon the screen 27 as shown in Fig. 4.

In order to prevent readings of adjacent capacity weights I preferably provide an opaque portion 43 for the portions of this screen adjacent the capacity weight indication.

In order to prevent excessive and other rotation of knob 36 suitable limit stops 45 and 46 may be provided. One of these limit stops is fixed to a fixed part of the casing or framework of the machine and another part is carried by one of the rotating parts, for example, one of the factoring cams or by gear 34.

What I claim is—

1. A weighing scale including a weight moved element, means for applying factored combinations of weights thereto, an indicating chart and means for differentially displacing the same in accordance with the various load off-setting values of one or a plurality of applied weights, and an optical device with provisions for projecting an indication of weight from said indicating device upon a screen.

2. A weighing scale having in combination with a scale element a capacity weight applying means for selecting and applying factored combinations of weights to said element, a single common means for displacing said weight applying means, a capacity weight indicator and geared connections intermediate said weight applying means and said indicator and driven by the weight applying means upon its displacement by the aforesaid displacing means for differentially positioning the said indicator in accordance with the summation of the load offsetting values of the applied capacity weights.

In testimony whereof I hereto affix my signature.

JAMES W. BRYCE.